United States Patent
Sreeram et al.

(10) Patent No.: US 11,138,308 B2
(45) Date of Patent: Oct. 5, 2021

(54) SYSTEM FOR PREVENTING SINGLE POINT OF FAILURE IN ACCESSING ENCRYPTED DATA

(71) Applicant: International Business Machines Corporation, Armonk, NY (US)

(72) Inventors: Jagadeesh Sreeram, Dublin, OH (US); Akhil Sivanantha, Dublin, OH (US); Liviu Rodean, Hilliard, OH (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 16/135,569

(22) Filed: Sep. 19, 2018

(65) Prior Publication Data
US 2020/0089868 A1    Mar. 19, 2020

(51) Int. Cl.
*G06F 21/46* (2013.01)
*G06F 21/31* (2013.01)
*H04L 9/32* (2006.01)

(52) U.S. Cl.
CPC .............. *G06F 21/46* (2013.01); *G06F 21/31* (2013.01); *H04L 9/3228* (2013.01); *H04L 9/3236* (2013.01)

(58) Field of Classification Search
CPC ....... G06F 21/46; G06F 21/31; H04L 9/3236; H04L 9/3228; H04L 9/0866; H04L 9/0643; H04L 9/0894
See application file for complete search history.

(56) References Cited

U.S. PATENT DOCUMENTS

| | | | |
|---|---|---|---|
| 4,997,288 A | 3/1991 | Rosenow | |
| 5,937,066 A | 8/1999 | Gennaro et al. | |
| 2002/0141593 A1 | 10/2002 | Kum et al. | |
| 2005/0138399 A1 | 6/2005 | Cheston et al. | |
| 2007/0107059 A1* | 5/2007 | Chasin | H04L 63/14 726/23 |
| 2007/0180271 A1* | 8/2007 | Hatakeyama | G06F 21/53 713/193 |
| 2008/0235521 A1* | 9/2008 | Gosselin | G06F 21/6218 713/193 |
| 2009/0296941 A1 | 12/2009 | Devanand et al. | |
| 2010/0290627 A1 | 11/2010 | Tsuji et al. | |

(Continued)

OTHER PUBLICATIONS

Rob High, "The Era of Cognitive Systems: An Inside Look at IBM Watson and How it Works," IBM Redbooks, 2012.

(Continued)

*Primary Examiner* — Henry Tsang
(74) *Attorney, Agent, or Firm* — Terrile, Cannatti & Chambers, LLP; Stephen A. Terrile

(57) ABSTRACT

A method, system and computer-usable medium for preventing a single point of failure in accessing encrypted data. In certain embodiments passwords of multiple system administrators are encrypted with a master key to generate encrypted master keys respectively associated with each system administrator. In certain embodiments, the passwords of the multiple system administrators are also one-way hashed to generate multiple one-way hashed passwords respectively associated with each system administrator. In certain embodiments, the user identifiers and plain text passwords may be used to decrypt the master key based on the encrypted master keys and one-way hashed passwords.

17 Claims, 6 Drawing Sheets

(56) References Cited

U.S. PATENT DOCUMENTS

| | | | | |
|---|---|---|---|---|
| 2013/0212385 A1* | 8/2013 | Schechter | ............ | H04L 9/0877 |
| | | | | 713/168 |
| 2014/0140508 A1* | 5/2014 | Kamath | ............... | H04L 9/0869 |
| | | | | 380/255 |
| 2014/0229733 A1* | 8/2014 | Henze | ................. | H04L 63/102 |
| | | | | 713/168 |
| 2015/0082032 A1* | 3/2015 | Bruce | ................. | H04L 63/083 |
| | | | | 713/168 |

OTHER PUBLICATIONS

Michael Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

SYSTEM FOR PREVENTING SINGLE POINT OF FAILURE IN ACCESSING ENCRYPTED DATA

BACKGROUND OF THE INVENTION

Field of the Invention

The present invention relates in general to the field of computers and similar technologies, and in particular to software utilized in this field. Still more particularly, it relates to a method, system and computer-usable medium for preventing a single point of failure in accessing encrypted data.

Description of the Related Art

Systems encrypt and store data using various techniques. Some systems rely on the use of a master key to encrypt and decrypt the data. In some instances, the system encrypts data in a data store by using intermediate keys, which are themselves encrypted by a master key. Given the importance of the master key, access to the master key is often restricted to a single system administrator.

SUMMARY OF THE INVENTION

A method, system and computer-usable medium for preventing a single point of failure in accessing encrypted data. In certain embodiments, the method comprises: accessing a master key; encrypting the master key with a password of a first system administrator; generating a one-way hashed password for the first system administrator using the password of the first system administrator; storing the encrypted master key and one-way hashed password of the first system administrator in a database with a user identifier of the first system administrator; encrypting the master key with a password of a second system administrator; generating a one-way hashed password for the second system administrator using the password of the second administrator; storing the encrypted master key and the one-way hashed password of the second system administrator in a database with the second user identifier for the second system administrator; allowing decryption of the master key using the user identifier and password of the first system administrator based on the encrypted master key and one-way hashed password of the first system administrator; and allowing decryption of the master key using the user identifier and password of the second system administrator based on the encrypted master key and one-way hashed password of the second system administrator.

In certain embodiments, the system comprises a processor, a data bus coupled to the processor, and a computer-usable medium embodying computer program code, the computer-usable medium being coupled to the data bus, the computer program code used for performing application aware rate-limiting operations and comprising instructions executable by the processor and configured for: accessing a master key; encrypting the master key with a password of a first system administrator; generating a one-way hashed password for the first administrator using the password of the first administrator; storing the encrypted master key and one-way hashed password of the first system administrator in a database with a user identifier of the first system administrator; encrypting the master key with a password of a second system administrator; generating a one-way hashed password for the second administrator using the password of the second administrator; storing the encrypted master key and the one-way hashed password of the second system administrator in a database with the second user identifier for the second system administrator; allowing decryption of the master key using the user identifier and password of the first system administrator based on the encrypted master key and one-way hashed password of the first system administrator; and allowing decryption of the master key using the user identifier and password of the second system administrator based on the encrypted master key and one-way hashed password of the second system administrator.

In certain embodiments, a non-transitory, computer-readable storage medium embodies computer program code, the computer program code comprising computer executable instructions configured for: accessing a master key; encrypting the master key with a password of a first system administrator; generating a one-way hashed password for the first administrator using the password of the first system administrator; storing the encrypted master key and one-way hashed password of the first system administrator in a database with a user identifier of the first system administrator; encrypting the master key with a password of a second system administrator; generating a one-way hashed password for the second administrator using the password of the second system administrator; storing the encrypted master key and the one-way hashed password of the second system administrator in a database with the second user identifier for the second system administrator; allowing decryption of the master key using the user identifier and password of the first system administrator based on the encrypted master key and one-way hashed password of the first system administrator; and allowing decryption of the master key using the user identifier and password of the second system administrator based on the encrypted master key and one-way hashed password of the second system administrator.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
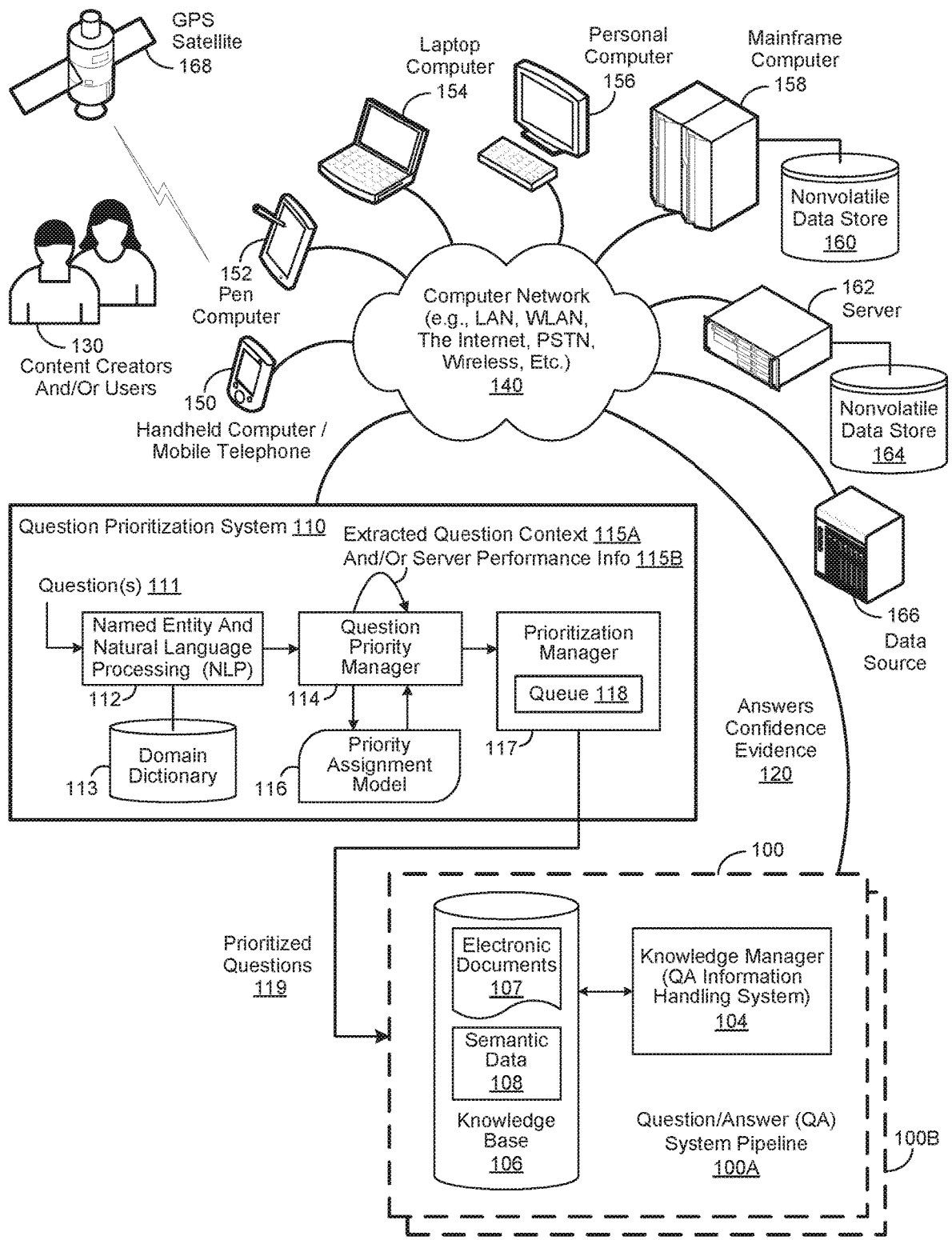
FIG. 1 shows a schematic diagram of one illustrative embodiment of a question/answer (QA) system.

Various aspects of the present disclosure include an appreciation that administrators often use a single administrator username and password to access the master key. However, use of a single administrator username and password for master key access can result in a single point of failure in which the system cannot be started or accessed without knowledge of the single administrator username and password. Such failures may occur, for example, when an administrator leaves their current role, possibly unexpectedly, without transitioning the username and/or account password to a successor.

In accordance with certain embodiments, a secure manner for generating and using administrator records for accessing the master key is set forth. In certain embodiments, multiple administrators may use their own default credentials (e.g., user ID and password) to conduct normal operations on the system as well as to conduct administrative operations requiring access to the master key. In this manner, multiple users may execute administrative operations so that the failure to transfer administrative functions occurring, for example, when an administrator leaves their current role is avoided. Rather, after registering for access to the master key using the operation set forth herein, multiple users will have access to the master key without a central individual controlling all such access. As a result, a single point of failure for accessing the master key is avoided.

The present invention may be a system, a method, and/or a computer program product. In addition, selected aspects of the present invention may take the form of an entirely hardware embodiment, an entirely software embodiment (including firmware, resident software, microcode, etc.), or an embodiment combining software and/or hardware aspects that may all generally be referred to herein as a "circuit," "module" or "system." Furthermore, aspects of the present invention may take the form of computer program product embodied in a computer-readable storage medium, or media, having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a dynamic or static random access memory (RAM), a read-only memory (ROM), an erasable programmable read-only memory (EPROM or Flash memory), a magnetic storage device, a portable Compact Disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Hypertext Precursor (PHP), or similar programming languages. The computer-readable program instructions may execute entirely on the user's computer, partly on the user's computer, as a stand-alone software package, partly on the user's computer and partly on a remote computer, or entirely on the remote computer or server or cluster of servers. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a schematic diagram of one illustrative embodiment of a QA system 100 and a question prioritization system 110 connected to a computer network 140 to operate as a conversational system in which a single point failure avoidance system may be implemented. The QA system 100 includes a knowledge manager 104 that is connected to a knowledge base 106 and configured to provide QA generation functionality for one or more content creators and/or users 130 who submit content across the network 140 to the QA system 100. To assist with efficient sorting and presentation of questions to the QA system 100, the question prioritization system 110 may be connected to the computer network 140 to receive user questions, and may include a plurality of sub-systems which interact with cognitive systems, like the QA system 100, to prioritize questions or requests being submitted to the QA system 100.

The Named Entity sub-system 112 receives and processes each question 111 by using natural language processing (NLP) to analyze each question and extract question topic information contained in the question, such as named entities, phrases, urgent terms, and/or other specified terms which are stored in one or more domain entity dictionaries 113. By leveraging a plurality of pluggable domain dictionaries 113 relating to different domains or areas (e.g., travel, healthcare, electronics, game shows, financial services, etc.), the domain dictionary 113 enables critical and urgent words (e.g., "threat level") from different domains (e.g., "travel") to be identified in each question based on their presence in the domain dictionary 113. To this end, the Named Entity sub-system 112 may use an NLP routine to identify the question topic information in each question. As used herein, "NLP" broadly refers to the field of computer science, artificial intelligence, and linguistics concerned with the interactions between computers and human (natural) languages. In this context, NLP is related to the area of human-computer interaction and Natural Language understanding by computer systems that enable computer systems to derive meaning from human or Natural Language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 113.

The Question Priority Manager sub-system 114 performs additional processing on each question to extract question context information 115A. In addition, or in the alternative, the Question Priority Manager sub-system 114 may also extract server performance information 115B for the question prioritization system 110 and/or QA system 100. In selected embodiments, the extracted question context information 115A may include data that identifies the user context and location when the question was submitted or received. For example, the extracted question context information 115A may include data that identifies the user who submitted the question (e.g., through login credentials), the device or computer which sent the question, the channel over which the question was submitted, or any combination thereof. Other examples may include the location of the user or device that sent the question, any special interest location indicator (e.g., hospital, public-safety answering point, etc.), other context-related data for the question, or any combination thereof. In certain embodiments, the location information is determined through the use of a Geographical Positioning System (GPS) satellite 168. In these embodiments, a handheld computer or mobile telephone 150, or other device, uses signals transmitted by the GPS satellite 168 to generate location information, which in turn is provided via the computer network 140 to the Question Priority Manager sub-system 114 for processing.

In various embodiments, the source for the extracted context information 115A may be a data source 166 accessed through the computer network 140. Examples of a data source 166 include systems that provide telemetry information, such as medical information collected from medical equipment used to monitor a patient's health, environment information collected from a facilities management system, or traffic flow information collected from a transportation monitoring system. In certain embodiments, the data source 166 may be a storage area network (SAN) or other network-based repositories of data.

In various embodiments, the data source 166 may provide data directly or indirectly collected from "big data" sources. In general, big data refers to a collection of datasets so large and complex that traditional database management tools and data processing approaches are inadequate. These datasets can originate from a wide variety of sources, including computer systems (e.g., 156, 158, 162), mobile devices (e.g., 150, 152, 154), financial transactions, streaming media, social media, as well as systems (e.g., 166) commonly associated with a wide variety of facilities and infrastructure (e.g., buildings, factories, transportation systems, power grids, pipelines, etc.). Big data, which is typically a combination of structured, unstructured, and semi-structured data poses multiple challenges, including its capture, curation, storage, transfer, search, querying, sharing, analysis and visualization.

The Question Priority Manager sub-system 114 may also determine or extract selected server performance data 115B for the processing of each question. In certain embodiments, the server performance information 115B may include operational metric data relating to the available processing resources at the question prioritization system 110 and/or QA system 100, such as operational or run-time data, CPU utilization data, available disk space data, bandwidth utilization data, and so forth. As part of the extracted information 115A/B, the Question Priority Manager sub-system 114 may identify the Service Level Agreement (SLA) or Quality of Service (QoS) processing requirements that apply to the question being analyzed, the history of analysis and feedback for the question or submitting user, and the like. Using the question topic information and extracted question context 115A and/or server performance information 115B, the Question Priority Manager sub-system 114 is configured to populate feature values for the Priority Assignment Model 116. In various embodiments, the Priority Assignment Model 116 provides a machine learning predictive model for generating target priority values for the question, such as by using an artificial intelligence (AI) approaches known to those of skill in the art. In certain embodiments, the AI logic is used to determine and assign a question urgency value to each question for purposes of prioritizing the response processing of each question by the QA system 100.

The Prioritization Manager sub-system 117 performs additional sort or rank processing to organize the received questions based on at least the associated target priority values such that high priority questions are put to the front of a prioritized question queue 118 for output as prioritized questions 119. In the question queue 118 of the Prioritization Manager sub-system 117, the highest priority question is placed at the front of the queue for delivery to the assigned QA system 100. In selected embodiments, the prioritized questions 119 from the Prioritization Manager sub-system 117 that have a specified target priority value may be assigned to a particular pipeline (e.g., QA system pipeline 100A, 100B) in the QA system 100. As will be appreciated, the Prioritization Manager sub-system 117 may use the question queue 118 as a message queue to provide an asynchronous communications protocol for delivering prioritized questions 119 to the QA system 100. Consequently, the Prioritization Manager sub-system 117 and QA system 100 do not need to interact with a question queue 118 at the same time by storing prioritized questions in the question queue 118 until the QA system 100 retrieves them. In this way, a wider asynchronous network supports the passing of prioritized questions 119 as messages between different QA system pipelines 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager sub-system 117 may be configured to convert over-subscribing questions into asynchronous responses, even if they were asked in a synchronized fashion.

The QA system 100 may include one or more QA system pipelines 100A, 100B, each of which includes a computing device 104 comprising one or more processors and one or more memories. The QA system pipelines 100A, 100B may likewise include potentially any other computing device elements generally known in the art including buses, storage devices, communication interfaces, and the like. In various embodiments, these computing device elements may be implemented to process questions received over the network 140 from one or more content creator and/or users 130 at computing devices (e.g., 150, 152, 154, 156, 158, 162). In certain embodiments, the one or more content creator and/or users 130 are connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable QA generation functionality for one or more content users 130. Other embodiments of QA system 100 may be used with components, systems, sub-systems, and/or devices other than those that are depicted herein.

In each QA system pipeline 100A, 100B, a prioritized question 119 is received and prioritized for processing to generate an answer 120. In sequence, prioritized questions 119 are de-queued from the shared question queue 118, from which they are de-queued by the pipeline instances for processing in priority order rather than insertion order. In selected embodiments, the question queue 118 may be implemented based on a "priority heap" data structure. During processing within a QA system pipeline (e.g., 100A, 100B), questions may be split into multiple subtasks, which run concurrently. In various embodiments, a single pipeline instance may process a number of questions concurrently, but only a certain number of subtasks. In addition, each QA system pipeline 100A, 100B may include a prioritized queue (not shown) to manage the processing order of these subtasks, with the top-level priority corresponding to the time that the corresponding question started (i.e., earliest has highest priority). However, it will be appreciated that such internal prioritization within each QA system pipeline 100A, 100B may be augmented by the external target priority values generated for each question by the Question Priority Manager sub-system 114 to take precedence, or ranking priority, over the question start time. In this way, more important or higher priority questions can "fast track" through a QA system pipeline 100A, 100B if it is busy with already-running questions.

In the QA system 100, the knowledge manager 104 may be configured to receive inputs from various sources. For example, knowledge manager 104 may receive input from the question prioritization system 110, network 140, a knowledge base or corpus of electronic documents 107 or other data, semantic data 108, content creators, and/or users 130, and other possible sources of input. In selected embodiments, some or all of the inputs to knowledge manager 104 may be routed through the network 140 and/or the question prioritization system 110. The various computing devices (e.g., 150, 152, 154, 156, 158, 162) on the network 140 may include access points for content creators and/or users 130. Some of the computing devices may include devices for a database storing a corpus of data as the body of information used by the knowledge manager 104 to generate answers to cases. The network 140 may include local network connections and remote connections in various embodiments, such that knowledge manager 104 may operate in environments of any size, including local (e.g., a LAN) and global (e.g., the Internet). Additionally, knowledge manager 104 serves as a front-end system that can make available a variety of knowledge extracted from or represented in documents, network-accessible sources and/or structured data sources. In this manner, some processes populate the knowledge manager, with the knowledge manager also including input interfaces to receive knowledge requests and respond accordingly.

In one embodiment, a content creator 130 creates content (e.g., a document) in a knowledge base 106 for use as part of a corpus of data used in conjunction with knowledge manager 104. In selected embodiments, the knowledge base 106 may include any file, text, article, or source of data (e.g., scholarly articles, dictionary definitions, encyclopedia references, and the like) for use by the knowledge manager 104. Content users 130 may access the knowledge manager 104 via a network connection or an Internet connection to the network 140, and may input questions to the knowledge manager 104 that may be answered by the content in the corpus of data.

As further described below, when a process evaluates a given section of a document for semantic content, the process can use a variety of conventions to query it from the knowledge manager 104. One convention is to send a well-formed question. As used herein, semantic content broadly refers to content based upon the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., Natural Language questions, etc.) to the knowledge manager 104. In various embodiments, the knowledge manager 104 may interpret the question and provide a response to the content user containing one or more answers to the question. In some embodiments, the knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 119 and the language used in each of the portions of the corpus of data found during the application of the queries using a variety of reasoning algorithms. There may be hundreds or even thousands of reasoning algorithms applied, each of which performs different analysis (e.g., comparisons), and generates a score. For example, certain reasoning algorithms may look at the matching of terms and synonyms within the language of the input question and the found portions of the corpus of data. Other reasoning algorithms may look at temporal or spatial features in the language, while yet others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 120 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 150 to large mainframe systems, such as mainframe computer 158. Examples of handheld computer 150 include personal digital assistants (PDAs), personal entertainment devices, such as MP3 players, portable televisions, and Compact Disc players. Other examples of information processing systems include pen, or tablet, computer 152, laptop, or notebook, computer 154, personal computer system 156, server 162, and mainframe computer 158.

As shown, the various information processing systems can be networked together using computer network 140. Types of computer network 140 that can be used to interconnect the various information processing systems include PANs, LANs, Wireless Local Area Networks (WLANs), the Internet, the PSTN, other wireless networks, and any other network topology that can be used to interconnect the information processing systems.

Figure 2:
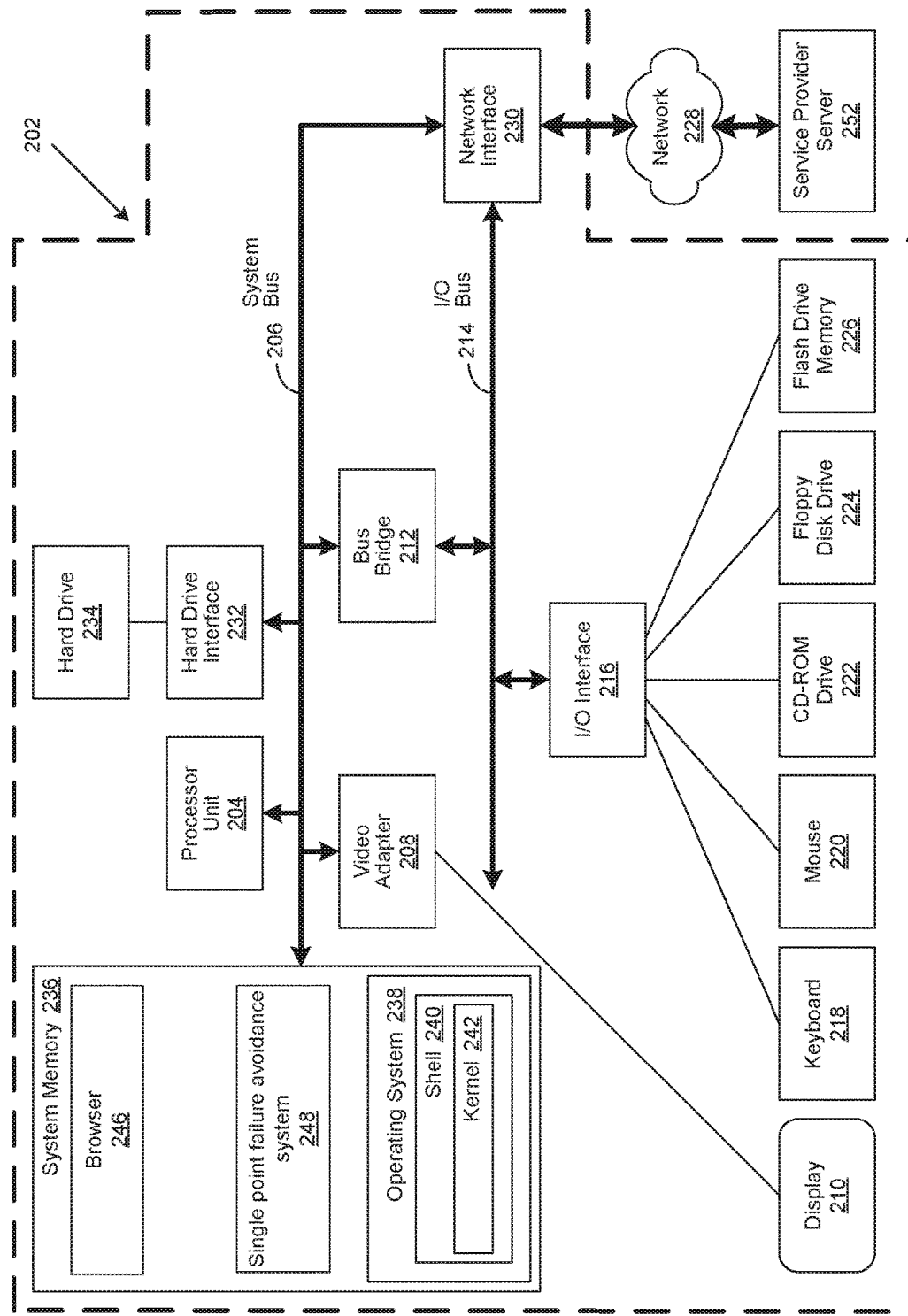
FIG. 2 shows a simplified block diagram of an information processing system capable of performing computing operations.

In selected embodiments, the information processing systems include nonvolatile data stores, such as hard drives and/or nonvolatile memory. Some of the information processing systems may use separate nonvolatile data stores. For example, server 162 utilizes nonvolatile data store 164, and mainframe computer 158 utilizes nonvolatile data store 160. The nonvolatile data store can be a component that is external to the various information processing systems or can be internal to one of the information processing systems. An illustrative example of an information processing system showing an exemplary processor and various components commonly accessed by the processor is shown in FIG. 2.

In various embodiments, the QA system 100 is implemented to receive a variety of data from various computing devices (e.g., 150, 152, 154, 156, 158, 162) and data sources 166, which in turn is used to perform QA operations described in greater detail herein. In certain embodiments, the QA system 100 may receive a first set of information from a first computing device (e.g., laptop computer 154). The QA system 100 then uses the first set of data to perform QA processing operations resulting in the generation of a second set of data, which in turn is provided to a second computing device (e.g., server 162). In response, the second computing device may process the second set of data to generate a third set of data, which is then provided back to the QA system 100. In turn, the QA system may perform additional QA processing operations on the third set of data to generate a fourth set of data, which is then provided to the first computing device.

In certain embodiments, a first computing device (e.g., server 162) may receive a first set of data from the QA system 100, which is then processed and provided as a second set of data to another computing device (e.g., mainframe 158). The second set of data is processed by the second computing device to generate a third set of data, which is provided back to the first computing device. The second computing device then processes the third set of data to generate a fourth set of data, which is then provided to the QA system 100, where it is used to perform QA operations described in greater detail herein.

In one embodiment, the QA system may receive a first set of data from a first computing device (e.g., handheld computer/mobile device 150), which is then used to perform QA operations resulting in a second set of data. The second set of data is then provided back to the first computing device, where it is used to generate a third set of data. In turn, the third set of data is provided back to the QA system 100, which then provides it to a second computing device (e.g., mainframe computer 158), where it is used to perform post processing operations.

As an example, a content user 130 may ask the question, "I'm looking for a good pizza restaurant nearby." In response, the QA system 100 may provide a list of three such restaurants in a half mile radius of the content user. In turn, the content user 130 may then select one of the recommended restaurants and ask for directions, signifying their intent to proceed to the selected restaurant. In this example, the list of recommended restaurants, and the restaurant the content user 130 selected, would be the third set of data provided to the QA system 100. To continue the example, the QA system 100 may then provide the third set of data to the second computing device, where it would be processed to generate a database of the most popular restaurants, by classification, location, and other criteria.

In various embodiments the exchange of data between various computing devices (e.g., 150, 152, 154, 156, 158, 162) results in more efficient processing of data as each of the computing devices can be optimized for the types of data it processes. Likewise, the most appropriate data for a particular purpose can be sourced from the most suitable computing device (e.g., 150, 152, 154, 156, 158, 162), or data source 166, thereby increasing processing efficiency. Skilled practitioners of the art will realize that many such embodiments are possible and that the foregoing is not intended to limit the spirit, scope or intent of the invention.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disc-Read-Only Memory (CD-ROM) drive 222, a floppy disk drive 224, and a flash drive memory 226. The format of the ports connected to I/O interface 216 may be any known to those skilled in the art of computer architecture, including, but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, the information processing system 202 is able to access a service provider server 252 to implement the present invention.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. In certain embodiments, system memory 236 may also include a Browser 246 having program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, system memory 236 may also include a single point failure avoidance system 248. In various embodiments, the single point failure avoidance system 248 includes code for implementing the processes described hereinbelow. In certain embodiments, the information processing system 202 is able to download the single point failure avoidance system 248 from a service provider server 252.

The hardware elements depicted in the information processing system 202 are not intended to be exhaustive, but rather are representative to highlight components that may be used to implement the present invention. For instance, the information processing system 202 may include alternate memory storage devices such as magnetic cassettes, DVDs, Bernoulli cartridges, and the like. These and other variations are intended to be within the spirit, scope and intent of the present invention.

The disclosed single point failure avoidance system 248 is designed with an appreciation that the use of a single administrative user ID and password may result in a single point of failure in which the system cannot be started or accessed without knowledge of the single administrator username and password. Such failures may occur, for example, when an administrator leaves their current role, possibly unexpectedly, without transitioning the username and/or account password to a successor.

In appreciation of these limitations, certain embodiments of the single point failure avoidance system 248 execute operations that allow one or more additional administrators to securely use their own user IDs and passwords to access the master key. In certain embodiments, the user IDs and passwords are the default user IDs and passwords used by the individuals to log into the system. In certain embodiments, a primary administrator may invite one or more other users to engage in a registration process in which the other users can securely register their own user IDs and passwords to obtain administrative privileges for accessing the master key.

Figure 3:
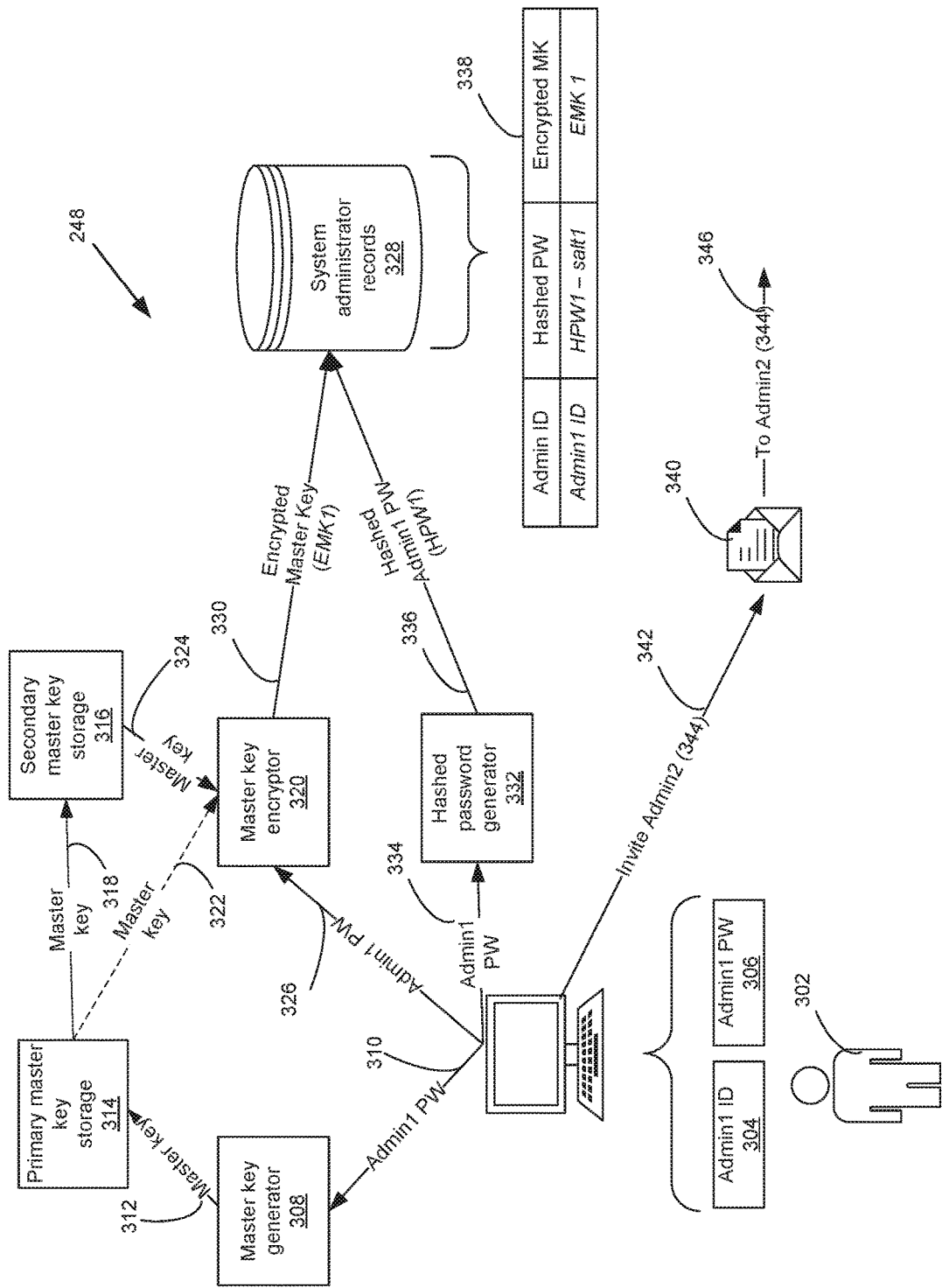
FIG. 3 depicts a functional block diagram of an electronic environment in which certain embodiments of the single point failure avoidance system may operate with respect to a first system administrator.

FIG. 3 depicts a functional block diagram of an electronic environment in which certain embodiments of the single point failure avoidance system 248 may operate. In certain embodiments, a system administrator 302 logs in to the system 248 using their user ID 304 and password 306. In certain embodiments, a master key has been generated prior to the login of the system administrator 302. In certain embodiments, such as the one shown in FIG. 3, the password 306 is passed to a master key generator 308 at operation 310, which generates a master key at operation 312. In certain embodiments, the master key may be passed to a primary master key storage 314. In certain embodiments, to protect the integrity of the master key, the primary master key storage 314 may be an independent data store that is isolated from other data stores of the system. In certain embodiments, the primary master key storage 314 is a secured hardware storage device. In certain embodiments, the master key is passed to secondary master key storage 316 at operation 318 when the system administrator 302 logs into the system. In certain embodiments, the secondary master key storage 316 comprises temporary memory, where the master key persists until the system administrator 302 logs out from the system.

In the example shown in FIG. 3, the single point failure avoidance system 248 includes a master key encryptor 320 which accesses the master key directly from the primary master key storage 314 (operation 322) or from the secondary master key storage 316 (operation 324). In certain embodiments, the master key encryptor 320 also accesses the password 306 of the system administrator 302 at operation 326. In certain embodiments, the master key encryptor 320 performs an encryption operation in which the master key is encrypted using the password 306 of the system administrator 302 to generate an encrypted master key EMK1, and stored in system administrator records 328 at operation 330.

In the example shown in FIG. 3, the single point failure avoidance system 248 also includes a hashed password generator 332. In certain embodiments, the hashed password generator 332 receives the administrator's password 306 at operation 334 and performs one or more secure hashing operations, such as a one-way hash operation, on the password 306 to generate an one-way hashed password HPW1 respectively associated with the system administrator 302. In certain embodiments, the one-way hashed password HPW1 is stored in the system administrator records 328 at operation 336. The secure hashing operations are selected so that no two users have the same hashed password, even if the text passwords of the two users are the same.

In certain embodiments, the system administrator records 328 include a system administrator table 338 having an administrative record associated with each registered system administrator. For clarity, the example shown in FIG. 3 only shows the administrative record associated with system administrator 302 in the system administrator table 338. In certain embodiments, the record for the system administrator 302 includes the administrator's user ID 304 (Admin1 ID), the one-way hashed password HPW1, and the encrypted master key EMK1 generated when the system administrator 302 registered as an administrator using the system 248. As explained in further detail herein, access to the master key for a given system administrator may be based on the information included in the system administrator table 338.

In certain embodiments, it is desirable to provide access to the master key to more than one individual. To this end, the system administrator 302 may generate an invitation 340 at operation 342 to invite another individual, such as Admin2 346 to register for access to the master key. In certain embodiments, the invitation 340 may be sent to Admin2 344 at operation 346 through, for example, email, text messaging, a web application. In certain embodiments, the invitation 340 may include a link to a registration application that may be executed by Admin2 344. In certain embodiments, the invitation may expire after a predetermined time. In certain embodiments, the invitation 340 may be on physical storage media, which is manually provided to Admin2 344. In certain embodiments, the physical storage media may include executable programs to allow Admin2 344 to register for access to the master key. In certain embodiments, the invitation 340 may be in the form of human readable material, such as paper, which may include instructions on how to register for access to the master key. In certain embodiments, the invitation 340 may include a temporary password that can be used to initiate the registration operations. It will be recognized, based on the teachings of the present disclosure, that other techniques for inviting another individual to register for access to the master key may be used.

Figure 4:
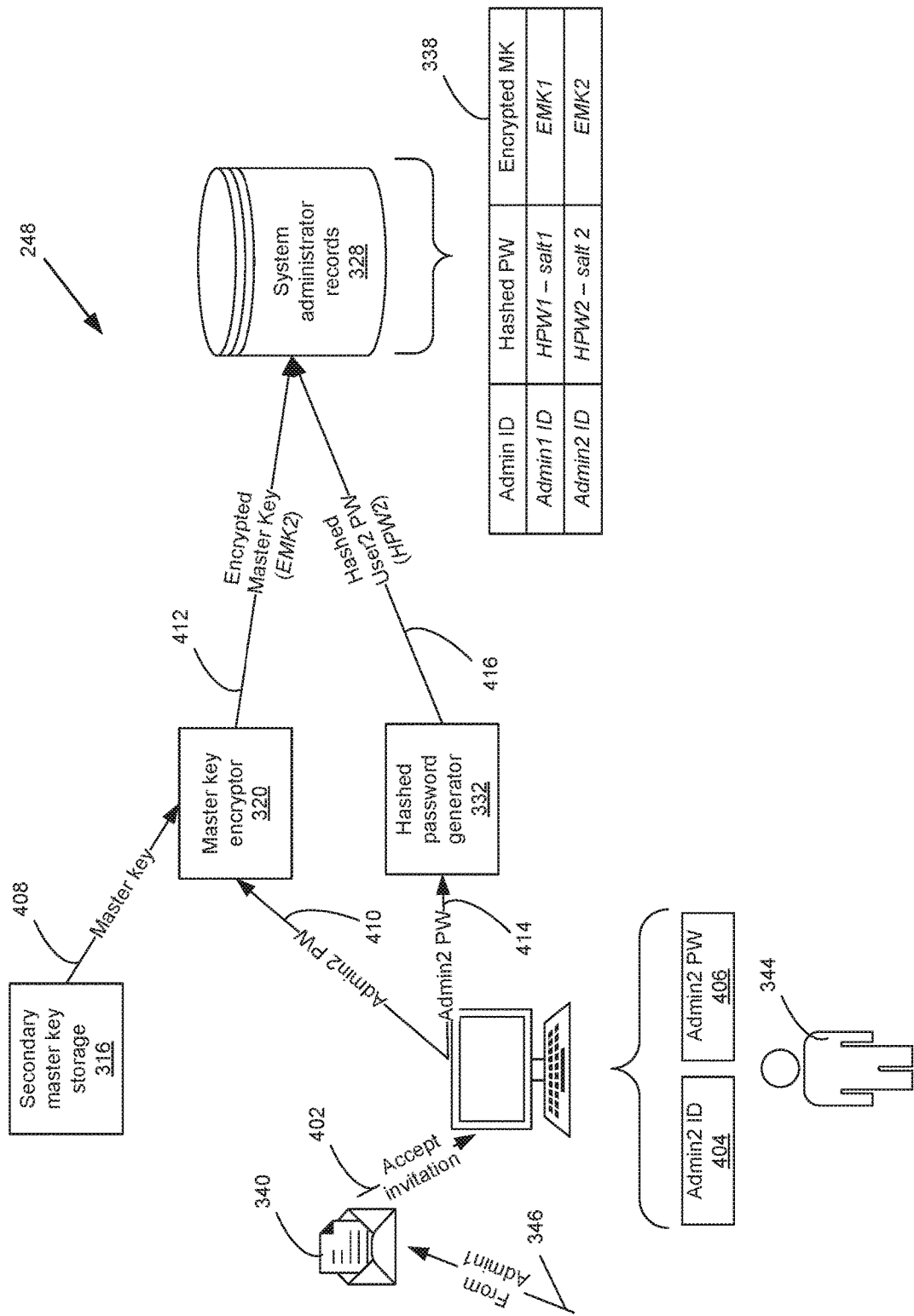
FIG. 4 depicts a functional block diagram of an electronic environment in which certain embodiments of the single point failure avoidance system may operate to register a second system administrator for access to a master key.

FIG. 4 depicts a functional block diagram of an electronic environment in which certain embodiments of the single point failure avoidance system 248 may operate. In certain embodiments, the invitation 340 is accepted by a further system administrator 344 at operation 402. In certain embodiments, the system administrator 344 logs in to the system 248 using their user ID 404 and password 406. In certain embodiments, the system administrator 302 remains logged into the system during the registration process thereby persisting the master key in the secondary master key storage 316.

In the example shown in FIG. 4, the master key encryptor 320 accesses the master key from the primary master key storage 314 at operation 408. Additionally, or in the alternative, the system administrator 344 may be granted temporary access to the primary master key storage 314 during the registration process. In certain embodiments, the master key encryptor 320 also accesses the password 406 of the system administrator 344 at operation 410. In certain embodiments, the master key encryptor 320 performs an encryption operation in which the master key is encrypted using the password 406 of the system administrator 344 to generate an encrypted master key EMK2, which is then stored in system administrator records 328 at operation 412.

In the example shown in FIG. 4, the hashed password generator 332 receives the administrator's password 306 at operation 414 and performs one or more secure encryption operations on the password 406 to generate a one-way hashed password HPW2 respectively associated with the system administrator 302. In certain embodiments, the one-way hashed password HPW2 is stored in the system administrator records 328 at operation 416.

In certain embodiments, once the one-way hashed password HPW2 and encrypted master key EMK1 have been generated, the system administrator records 328 are appended to include system administrator 344 as a registered user authorized to access the master key. In certain embodiments, the record for the system administrator 344 includes the user ID 404 (Admin2 ID), the one-way hashed password HPW2, and the encrypted master key EMK2 generated when the system administrator 302 registered as an administrator using the system 248. As explained in further detail herein, access to the master key for a given system administrator may be based on the information included in the system administrator table 338.

Figure 5:
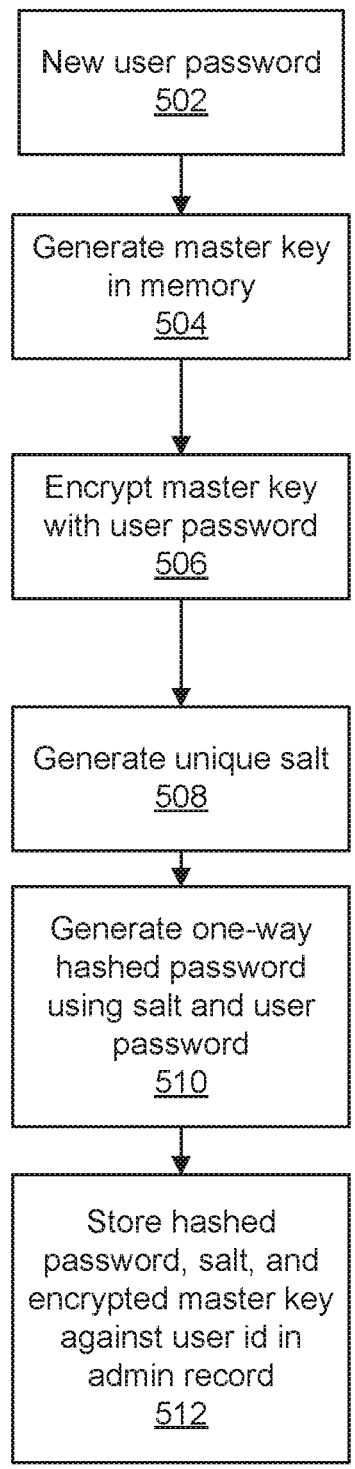
FIG. 5 is a flowchart depicting exemplary operations that may be executed by the hashed password generator.

FIG. 5 is a flowchart depicting exemplary operations that may be executed to register an initial system administrator, such as Admin1. In certain embodiments, a new user password that is to be registered for Admin1 is entered at operation 502 and a master key is generated in memory at operation 504. In certain embodiments, the master key may be generated using the user password entered at operation 502. In certain embodiments, the master key is encrypted with the user password at operation 506 and a unique salt is generated at operation 508. In certain embodiments, both the salt and password are used to generate a one-way hashed password for the user. In certain embodiments, the hashed password is generated at operation 510 using the salt and user password. In certain embodiments, the hashed password, salt, and encrypted master key are stored against the user ID in an administrator record at operation 512.

In certain embodiments, the one-way hashed password for each user is stored along with the corresponding salt (see, e.g., salt1 and salt2 of FIG. 4) and is associated with the corresponding record for the user. In certain embodiments, the salt may be stored in the same field as the hashed password in the administrator's records. In certain embodiments, the salt may be stored in a separate field of the administrator's records. In certain embodiments, the number of iterations used in the hashing operations used to generate the hashed password may also be included in the administrator's records. In certain embodiments, these encryption operations prevent access to the master key even in instances where two or more users have the same text passwords.

Figure 6:
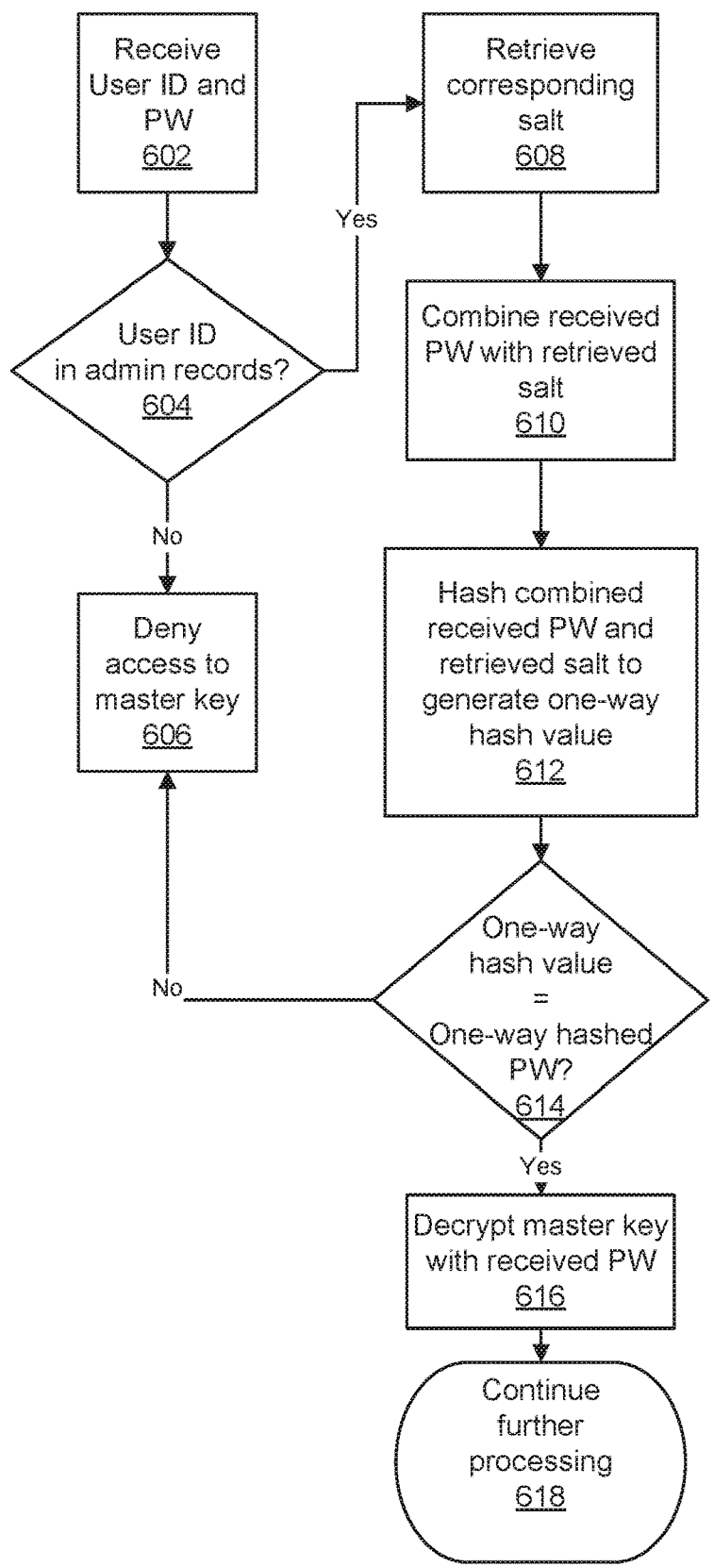
FIG. 6 is a flowchart depicting exemplary operations that may be executed by the system to allow and/or deny access to the master key.

In certain embodiments, the unique salt is generated at the time that the password has been created or changed by the user. Additionally, or in the alternative, the salt may be generated at the time that a system administrator registers for access to the master key. As used herein, a salt is a set of random bits that are generated at the time a password is generated, changed, or registered for access to the master key. Since the set of bits are random, it is unlikely that individuals using the same password will have the same salt FIG. 6 is a flowchart depicting exemplary operations that may be executed by the system to allow and/or deny access to the master key. In the illustrated example, the user enters their user ID and password at operation 602. In certain embodiments, a determination is made at operation 604 as to whether the administrative records include a record corresponding to the user ID. If not, access to the master key may be denied at operation 606. If the user ID is found, the information associated with the user ID stored in the administrator records is used to proceed with further operations pursuant to granting or denying access to the master key.

In certain embodiments, the salt associated with the user ID in the administrator records is retrieved at operation 608. In certain embodiments, the retrieved salt and received password are combined at operation 610 and one-way hashed at operation 612 using, for example, the same one-way hashing operations used to originally generate the one-way hashed password associated with the user ID during registration. In certain embodiments, execution of the one-way hashing at operation 612 results in a hashed value, which is compared at operation 614 against the hashed one-way password stored in the record for the user ID. If the hashed value and the one-way hashed password are the same, the encrypted master key in the record for the user ID is decrypted using the received password and is made available for access to execute various data encryption/ decryption operations 618. Otherwise, the user is denied access to the master key at operation 606.

Although the present invention has been described in detail, it should be understood that various changes, substitutions and alterations can be made hereto without departing from the spirit and scope of the invention as defined by the appended claims.

What is claimed is:

1. A computer-implemented method for preventing single point of failure in accessing encrypted data, comprising:
   accessing a master key;
   encrypting the master key with a password of a first system administrator;
   generating a one-way hashed password for the first system administrator using the password of the first system administrator;
   storing the encrypted master key and one-way hashed password of the first system administrator in a database with a user identifier of the first system administrator;
   executing a registration operation to provide master key level administration privileges to a second system administrator, wherein the registration operation includes
      sending an invitation from the first system administrator to the second system administrator to engage the second system administrator in the registration operation,
      entering, by the second system administrator, a password of the second system administrator,
      making the master key temporarily available for use in registering the second system administrator during the registration operation by temporarily decrypting the master key in secondary master key storage by the first system administrator for temporary access during the registration operation,
      encrypting the master key with the password of the second system administrator;
      generating a one-way hashed password for the second system administrator using the password of the second system administrator,
      storing the encrypted master key and the one-way hashed password of the second system administrator in a database with the user identifier for the second system administrator,
      and
      removing the temporary availability to the master key upon completion of the registration operation;
   allowing decryption of the master key using the user identifier and password of the first system administrator based on the encrypted master key and the one-way hashed password of the first system administrator; and
   allowing decryption of the master key using the user identifier and password of the second system administrator based on the encrypted master key and the one-way hashed password of the second system administrator.

2. The computer-implemented method of claim 1, wherein
   the one-way hashed password for the first system administrator is generated by one-way hashing the password of the first system administrator and a salt associated with the first system administrator, wherein the salt associated with the password of the first system administrator is stored with the one-way hashed password of the first system administrator; and
   the one-way hashed password for the second system administrator is generated by one-way hashing the password of the second system administrator and a salt associated with the second system administrator, wherein the salt associated with the second system administrator is stored with the one-way hashed password for the second system administrator.

3. The computer-implemented method of claim 2, wherein
the salt associated with second administrator is a salt generated at a time at which the password of the second system administrator is generated.

4. The computer-implemented method of claim 2, further comprising:
receiving login authentication information including a user identifier and password;
determining whether the user identifier and password in the received login authentication information are associated with a user in the database;
if the login authentication information is associated with a user in the database,
accessing the one-way hashed password and encrypted master key associated with the user identifier;
using the salt stored with the one-way hashed password associated with the user identifier to execute a one-way hash operation on the password received in the login authentication information;
comparing the one-way hash of the received password with the one-way hashed password associated with the user identifier; and
allowing decryption of the master key using the user identifier and password received in the login authentication information only if the one-way hashed value of the received password is the same as the one-way hashed password associated with the user identifier.

5. The computer-implemented method of claim 1, wherein
the decrypted master keys of the first and second system administrators are used to decrypt data encrypted with the master key.

6. The computer-implemented method of claim 1, wherein
the master key is generated from the password of the first system administrator.

7. A system comprising:
a processor;
a data bus coupled to the processor; and
a computer-readable storage medium embodying computer program code, the computer-readable storage medium being coupled to the data bus, the computer program code used for performing application aware rate-limiting operations and comprising instructions executable by the processor and configured for:
accessing a master key;
encrypting the master key with a password of a first system administrator;
generating a one-way hashed password for the first system administrator using the password of the first system administrator;
storing the encrypted master key and one-way hashed password of the first system administrator in a database with a user identifier of the first system administrator;
executing a registration operation to provide master key level administration privileges to a second system administrator, wherein the registration operation includes sending an invitation from the first system administrator to a second system administrator to engage the second system administrator in the registration operation,
entering, by the second system administrator, a password of the second system administrator,
making the master key temporarily available for use in registering the second system administrator during the registration operation by temporarily decrypting the master key in secondary master key storage by the first system administrator for temporary access during the registration operation,
encrypting the master key with the password of the second system administrator,
generating a one-way hashed password for the second system administrator using the password of the second system administrator,
storing the encrypted master key and the one-way hashed password of the second system administrator in a database with the user identifier for the second system administrator, and
removing the temporary availability to the master key upon completion of the registration operation;
allowing decryption of the master key using the user identifier and password of the first system administrator based on the encrypted master key and one-way hashed password of the first system administrator; and
allowing decryption of the master key using the user identifier and password of the second system administrator based on the encrypted master key and one-way hashed password of the second system administrator.

8. The system of claim 7, wherein
the one-way hashed password for the first system administrator is generated by one-way hashing the password of the first system administrator and a salt associated with the first system administrator, wherein the salt associated with the first system administrator is stored with the one-way hashed password for the first system administrator; and
the one-way hashed password for the second system administrator is generated by one-way hashing the password of the second system administrator and a salt associated with the second system administrator, wherein the salt associated with the second system administrator is stored with the one-way hashed password for the second system administrator.

9. The system of claim 8, wherein
the salt associated with second administrator is a salt generated at a time at which the password of the second system administrator is generated.

10. The system of claim 8, further comprising:
receiving login authentication information including a user identifier and password;
determining whether the user identifier and password in the received login authentication information are associated with a user in the database;
if the login authentication information is associated with a user in the database, accessing the one-way hashed password and encrypted master key associated with the user identifier;
using the salt stored with the one-way hashed password associated with the user identifier to execute a one-way hash operation on the password received in the login authentication information;
comparing the one-way hash of the received password with the one-way hashed password associated with the user of the user identifier; and allowing decryption of the master key using the user identifier and password received in the login authentication information only if the one-way hash of the received password is the same as the one-way hashed password associated with the user identifier.

11. The system of claim 7, wherein
the decrypted master keys of the first and second system administrators are used to decrypt data encrypted with the master key.

12. A non-transitory, computer-readable storage medium embodying computer program code, the computer program code comprising computer executable instructions configured for:
accessing a master key;
encrypting the master key with a password of a first system administrator;
generating a one-way hashed password for the first system administrator using the password of the first system administrator;
storing the encrypted master key and one-way hashed password of the first system administrator in a database with a user identifier of the first system administrator;
executing a registration operation to provide master key level administration privileges to a second system administrator, wherein the registration operation includes
sending an invitation from the first system administrator to the second system administrator to engage the second system administrator in the registration operation,
entering, by the second system administrator, a password of the second system administrator,
making the master key temporarily available for use in registering the second system administrator during the registration operation by temporarily decrypting the master key in secondary master key storage by the first system administrator for temporary access during the registration operation;
encrypting the master key with the password of the second system administrator;
generating a one-way hashed password for the second system administrator using the password of the second system administrator;
storing the encrypted master key and the one-way hashed password of the second system administrator in a database with the user identifier for the second system administrator, and
removing the temporary availability to the master key upon completion of the registration operation;
allowing decryption of the master key using the user identifier and password of the first system administrator based on the encrypted master key and one-way hashed password of the first system administrator; and
allowing decryption of the master key using the user identifier and password of the second system administrator based on the encrypted master key and one-way hashed password of the second system administrator.

13. The non-transitory, computer-readable storage medium of claim 12, wherein
the one-way hashed password of the first system administrator is generated by one-way hashing the password of the first system administrator and a salt associated with the first system administrator, wherein the salt associated with the first system administrator is stored with the one-way hashed password of the first system administrator; and
the one-way hashed password of the second system administrator is generated by hashing the password of the second system administrator and a salt associated with the second system administrator, wherein the salt associated with the second system administrator is stored with the one-way hashed password of the second system administrator.

14. The non-transitory, computer-readable storage medium of claim 13, wherein
the salt associated with second administrator is a salt generated at a time at which the password of the second system administrator is generated.

15. The non-transitory, computer-readable storage medium of claim 13, further comprising:
receiving login authentication information including a user identifier and password;
determining whether the user identifier and password in the received login authentication information are associated with a user in the database;
if the login authentication information is associated with a user in the database,
accessing the one-way hashed password and encrypted master key associated with the user identifier;
using the salt stored with the one-way hashed password associated with the user identifier to execute a one-way hash operation on the password received in the login authentication information;
comparing the one-way hash of the received password with the one-way hashed password associated with the user identifier; and
allowing decryption of the master key using the user identifier and password received in the login authentication information only if the one-way hash of the received password is the same as the one-way hash of the password associated with the user identifier.

16. The non-transitory, computer-readable storage medium of claim 12, wherein
the decrypted master keys of the first and second system administrators are used to decrypt data encrypted with the master key.

17. The non-transitory, computer-readable storage medium of claim 12, wherein
the master key is generated from the password of the first system administrator.

* * * * *